(12) United States Patent
Yamamoto

(10) Patent No.: US 6,875,925 B2
(45) Date of Patent: Apr. 5, 2005

(54) INSULATING SHEET AND ELECTRONIC APPARATUS USING THE SAME

(75) Inventor: Hideki Yamamoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/768,155

(22) Filed: Feb. 2, 2004

(65) Prior Publication Data

US 2004/0149487 A1 Aug. 5, 2004

(30) Foreign Application Priority Data

Feb. 4, 2003 (JP) ........................................ 2003-027618

(51) Int. Cl.[7] .............................................. H02G 15/064
(52) U.S. Cl. ..................... 174/72 A; 174/135; 361/680; 361/679
(58) Field of Search .............................. 174/72 A, 135; 361/680, 679

(56) References Cited

U.S. PATENT DOCUMENTS 5,400,213 A * 3/1995 Honda et al. ............... 361/680
5,430,608 A * 7/1995 Honda et al. ............... 361/683
5,448,446 A * 9/1995 Honda et al. ............... 361/680

FOREIGN PATENT DOCUMENTS

| JP | A 2-142049 | 11/1990 | ................. 174/135 |
| JP | A 3-114349 | 11/1991 | ............... 174/72 A |
| JP | A 2001-284860 | 10/2001 | ................. 174/135 |
| JP | A 2002-152627 | 5/2002 | ................. 174/135 |
| JP | A 2002-152630 | 5/2002 | ................. 174/135 |

* cited by examiner

Primary Examiner—Anthony Dinkins
Assistant Examiner—Anton Harris
(74) Attorney, Agent, or Firm—Oliff & Berridge, PLC

(57) ABSTRACT

An insulating sheet is used in an electronic apparatus including a power supply board, a housing in which the power supply board is disposed, and a conductive bottom plate attached to the housing. The insulating sheet is disposed between the power supply board and the bottom plate. The insulating sheet includes an opening portion which allows air flowing from an air inlet to pass therethrough; and a guide portion erected in order to guide a harness disposed in the housing.

21 Claims, 9 Drawing Sheets

INSULATING SHEET AND ELECTRONIC APPARATUS USING THE SAME

BACKGROUND OF THE INVENTION

1. Field of the Invention

The present invention relates to an insulating sheet by which a power supply board including a power supply circuit and a conductive bottom plate for covering the power supply board are insulated from each other, and an electronic apparatus using the insulating sheet.

2. Description of the Related Art

Safety standards such as UL Standard have been defined for an electronic apparatus including a power supply circuit etc. A predetermined distance needs to be provided between a power supply board and a conductive bottom plate for covering the power supply board. If it is difficult to provide the distance, it is necessary to provide an insulating sheet or the like to ensure safety. Recently, there is a case where the bottom plate and the power supply board are brought close to each other in order to reduce the size of the electronic apparatus. In this case, the insulating sheet is used to ensure safety.

JP-A-2002-152630 (pages 5–7 and FIG. 5) has disclosed a configuration in which an insulating sheet is interposed between a circuit board of an electronic circuit and a liquid crystal panel in order to ensure the safety. When an insulating sheet is interposed between the conductive bottom plate and the power supply board in the same manner as described above, reduction in size of the electronic apparatus can be attained while safety can be ensured.

SUMMARY OF THE INVENTION

There has been a great need for reduction in size of the electronic apparatus in recent years. If the size of the electronic apparatus is reduced more greatly, air permeability in the electronic apparatus is lowered. This causes a problem that heat cannot be sufficiently radiated from the power supply circuit. In addition, when a harness for connecting modules to one another is provided so as to be adjacent to the power supply board, it is necessary from the point of view of safety standards that measures are taken to prevent primary wiring in the power supply circuit and secondary wiring from coming into contact with each other. However, a space for avoiding the contact between the primary and secondary wiring cannot be provided because of reduction in size. This causes a problem that the number of parts for shielding the primary and secondary sides from each other increases.

An insulating sheet and an electronic apparatus using the insulating sheet are disclosed herein in which both improvement in heat radiating characteristic of an electronic apparatus and reduction in the number of parts can be attained.

An insulating sheet according to an embodiment of the invention includes a sheet portion, an opening portion, and a guide portion. The opening portion allows air to pass therethrough. The guide portion is erected. With this configuration, cooling air can be supplied to a power supply circuit through the opening portion. In addition, the guide portion can prevent the harness from being put between a bottom plate and a power supply board.

According to the embodiment of the invention, an electronic apparatus includes a power supply board, a housing, a conductive bottom plate, and an insulating sheet. The power supply board and a harness are disposed in the housing. The conductive bottom plate is attached to the housing and is defined an air inlet. The insulating sheet includes a sheet portion, an opening portion, and a guide portion. The opening portion allows air flowing from the air inlet of the conductive bottom plate to pass therethrough. The guide portion is erected and guides the harness. The insulating sheet is disposed between the power supply board and the conductive bottom plate.

DETAILED DESCRIPTION OF THE PREFERRED EMBODIMENT

Figure 1:
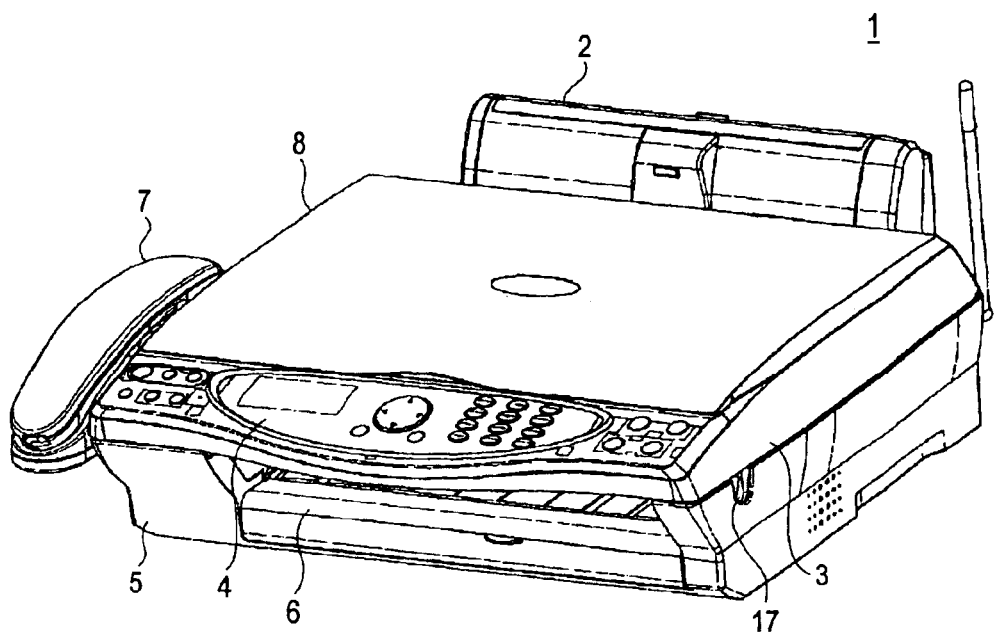
FIG. 1 is a perspective view showing a multi function device according to an embodiment of the invention.

An embodiment of the invention will be described below with reference to the drawings. FIG. 1 is a perspective view showing a multi function device, which is an electronic apparatus according to an embodiment of the invention. The multi function device 1 is provided as a combination apparatus having a telephone function and a copying function in addition to a facsimile function and further having a scanner function and a printer function when connected to a personal computer or the like.

A body portion 5 of the multi function device 1 contains an ink cartridge (not shown) in its inside. Printing can be made when ink fed from the ink cartridge is ejected onto a transported sheet of recording paper by an ink jet recording head 48 (see FIG. 3), which will be described later. A paper supply portion 2 for supplying sheets of recording paper into the body portion 5 is provided in the rear of the body portion 5. A paper outlet portion 6 for discharging printed sheets of recording paper is provided in front of the body portion 5. A handset 7 is disposed on a side of the body portion 5 so that telephone communication can be made.

A reading portion 3 is disposed on the body portion 5 so that a picture image can be read from a document placed thereon after an upper cover 8 is opened. An operation panel 4 is provided in front of the reading portion 3 so that a user operation such as an entry of a telephone number can be made. The reading portion 3 can pivot relatively to the body portion 5 so as to be opened/closed. When the reading portion 3 is opened, removal of paper at the time of jamming and exchange of the ink cartridge can be made.

Figure 2:
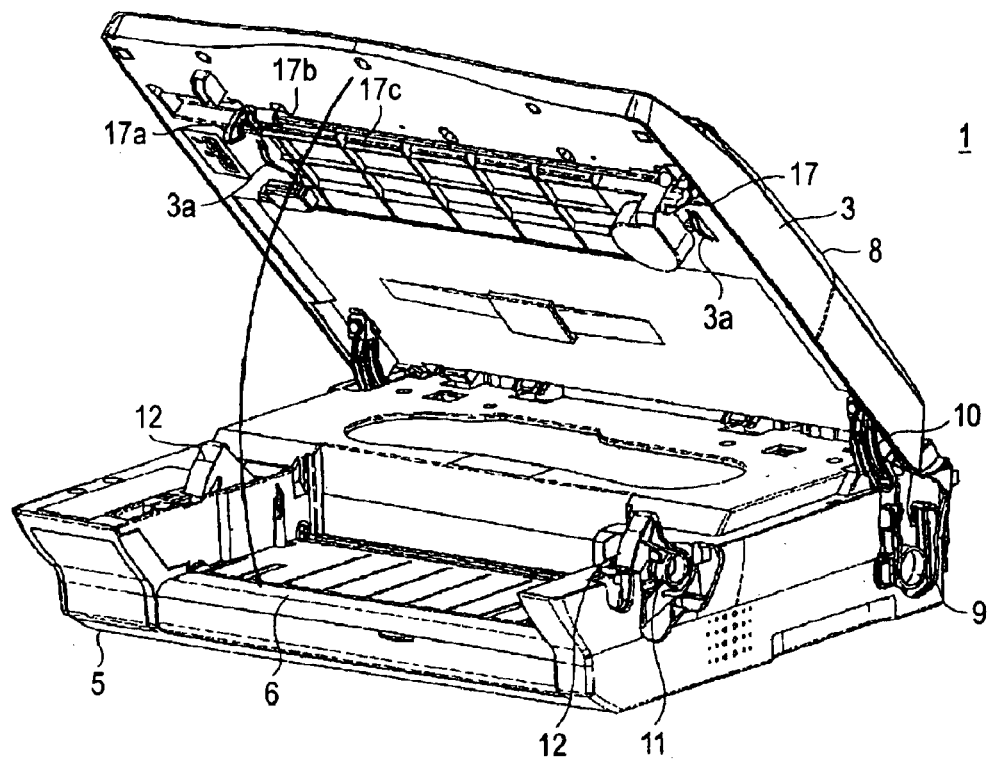
FIG. 2 is a perspective view showing the multi function device according to the embodiment of the invention in a state in which a reading portion is opened.

FIG. 2 shows a state in which the reading portion 3 is opened. Arch-like links 10 are provided on opposite pivotal sides of the reading portion 3 so as to extend. The links 10 are engaged with the body portion 5 and serve as stoppers for retaining the open position of the reading portion 3. Stopper springs 9 disposed in the body portion 5 are connected to the links 10. The stopper springs 9 urge the reading portion 3 in the opening direction. Incidentally, the reading portion 3 is configured so that the position of the reading portion 3 can be retained by the links 10 in a state shown in FIG. 2.

A lock lever 17 is attached to a front portion of the reading portion 3. The lock lever 17 has left and right claw portions 17a, a spring 17b, and a shaft portion 17c. The lock lever 17 can turn back and forth while urged backward in FIG. 1 by the spring 17b. The claw portions 17a are engaged with lock portions (not shown) provided in the body portion 5 to thereby lock the reading portion 3 on the body portion 5. Hoppers 12 are provided in the body portion 5 to be ratatable. The hoppers 12 are urged in the opening direction of the reading portion 3 by hopper springs 11 respectively.

When the reading portion 3 is closed against the urging force of the stopper springs 9, the hoppers 12 abut against guide portions 3a provided in a lower surface of the reading portion 3. When the reading portion 3 is further closed, the hoppers 12 rotate so as to be forced into the body portion 5. When the reading portion 3 reaches a lock position, the lock lever 17 urged by the spring 17b rotates in the locking direction so that the claw portions 17a are engaged with the lock portions (not shown). As a result, the reading portion 3 is locked in the closed state.

Accordingly, the reading portion 3 is urged in the opening direction only by the stopper springs 9 when the rotation moment due to its own weight is small but urged in the opening direction by the stopper strings 9 and the hopper springs 11 when the rotation moment due to its own weight is large.

In this manner, the reading portion 3 can be pivoted smoothly while danger or fear of catching a finger in the closed reading portion 3 is avoided. In addition, because members for urging the reading portion 3 is disposed so as to be distributed in the direction of the radius of pivoting movement, hinge portions can be simplified in structure. As a result, reduction in size of the multi function device 1 can be attained.

The reading portion 3 can be opened as follows. When the lock lever 17 is operated by a finger to disengage the claw portions 17a from the lock portions (not shown), the reading portion 3 is unlocked. When the reading portion 3 is unlocked, the reading portion 3 is retained in a state in which the reading portion 3 is pushed up by the hoppers 12 on the basis of the urging force of the hopper springs 11.

Then, the user can open the reading portion 3 manually as shown in FIG. 2. Incidentally, when the reading portion 3 is closed, the urging force of the stopper springs 9 is maximized because the deformation of the stopper springs 9 is maximized. Accordingly, the reading portion 3 can be restrained from moving in the closing direction powerfully.

Figure 3:
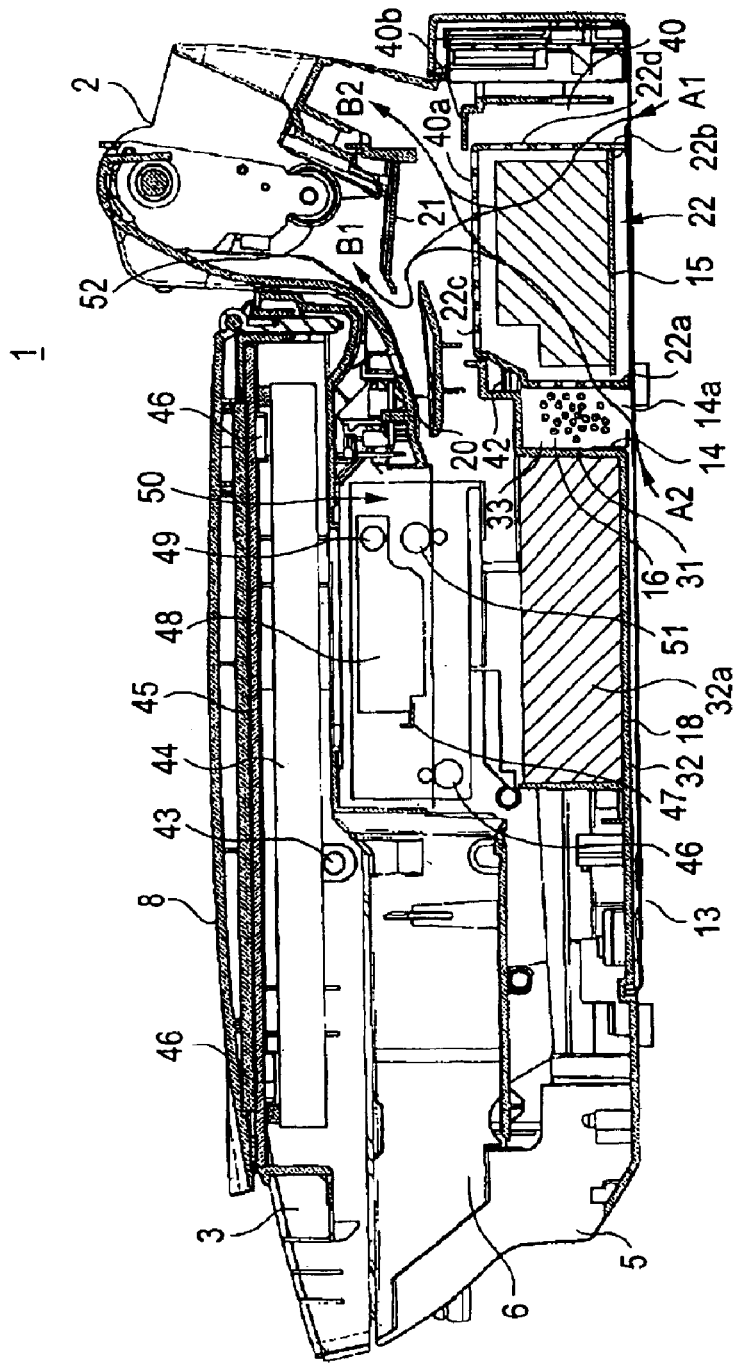
FIG. 3 is a side sectional view showing the multi function device according to the embodiment of the invention.
Figure 4:
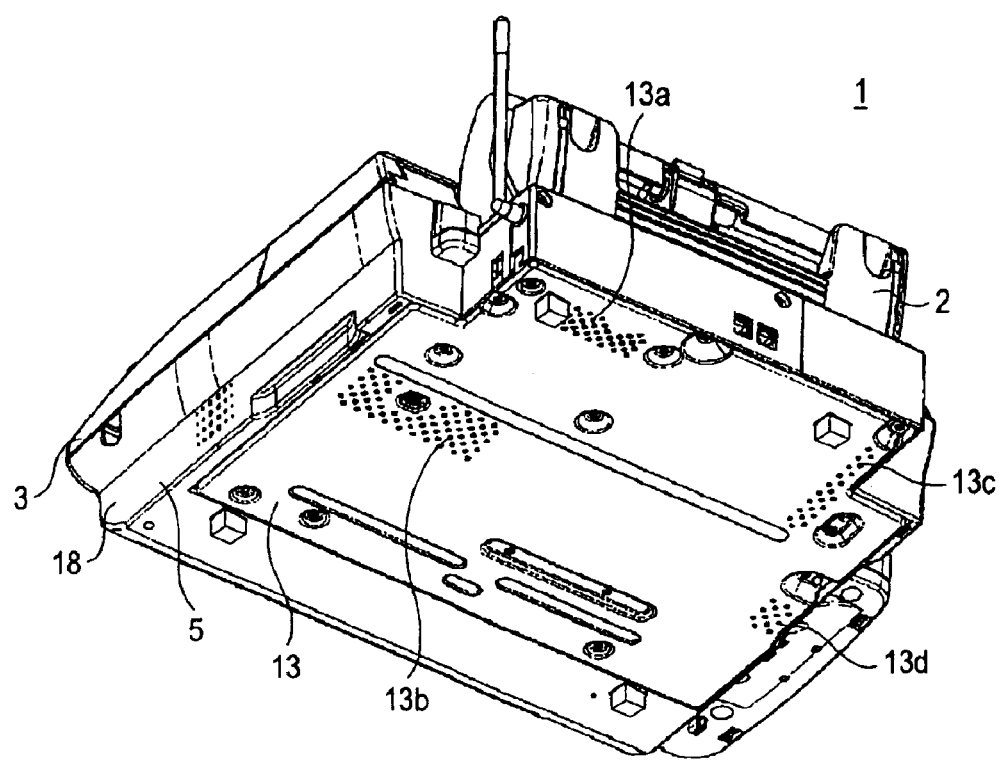
FIG. 4 is a perspective view showing the multi function device according to the embodiment of the invention from the back.

FIG. 3 is a side sectional view of the multi function device 1. FIG. 4 is a perspective view of the multi function device 1 from the back. The reading portion 3 has a document table glass plate 45, a reading unit 44, a guide shaft 43, and a slider 46. A document is placed on the document table glass plate 45. The reading unit 44 is disposed below the document table glass plate 45 so that the reading unit 44 can move in a direction perpendicular to a plane on which FIG. 3 is drawn. While the reading unit 44 is guided by the guide shaft 43, the reading unit 44 can be moved along the document table glass plate 45 by the slider 46.

The paper supply portion 2 has a feed roller 52, a paper bearing surface 21, and a paper guide 20. A drive source not shown drives the feed roller 52 to feed out sheets of recording paper one by one. The paper bearing surface 21 supports the sheets of recording paper before the sheets of recording paper are separated one by one. The paper guide 20 guides the sheets of recording paper after the sheets of recording paper are separated one by one.

The body portion 5 includes a recording unit 50 for performing recording on a sheet of recording paper fed from the paper supply portion 2, and a control board for controlling the multi function device 1. The recording unit 50 has a carriage guide shaft 49, a carriage guide 47, an ink jet recording head 48, a pair of carrying rollers 51, and a pair of delivery rollers 46.

The carriage guide shaft 49 and the carriage guide 47 guide the inkjet recording head 48 in a direction perpendicular to the plane on which FIG. 3 is drawn. The ink jet recording head 48 performs printing by ejecting ink onto the sheet of recording paper from an ink jet cartridge (not shown). The sheet of recording paper fed from the paper supply portion 2 is carried to a print position by the pair of carrying rollers 51. The printed sheet of recording paper is delivered to the paper outlet portion 6 by the pair of delivery rollers 46. A waste ink foam 32a is disposed below the recording unit 50 so that waste ink not used for recording is absorbed to and held in the waste ink foam 32a.

Figure 7:
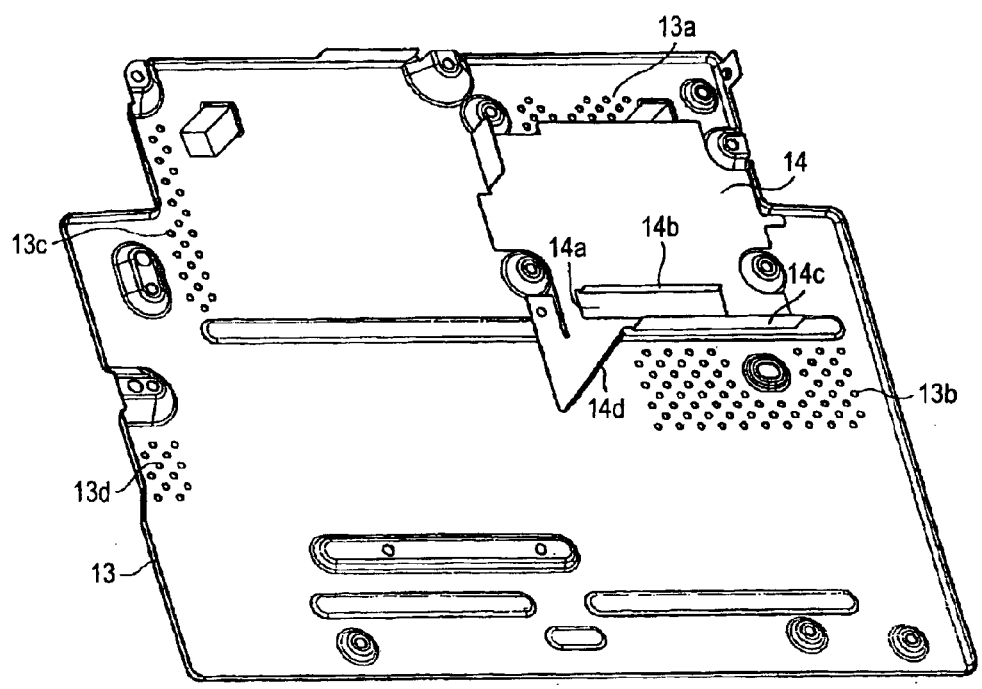
FIG. 7 is a perspective view showing the positional relation between the bottom plate and the insulating sheet in the multi function device according to the embodiment of the invention.

A housing 18 made of an inexpensive flammable resin molding defines an external form of the body portion 5. The bottom of the body portion 5 is covered with a bottom plate 13. FIG. 7 is a perspective view showing the bottom plate 13. The bottom plate 13 is made of an iron plate or an aluminum plate. The bottom plate 13 has air inlets 13a, 13b, 13c and 13d through which air can be taken in upward from the bottom of the housing 18.

Figure 9:
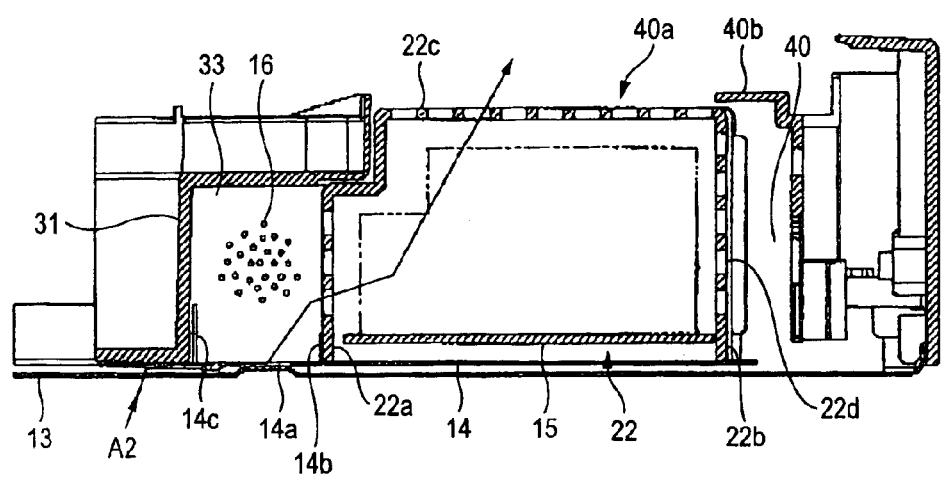
FIG. 9 is a partially side sectional view showing a lower rear portion of the multifunction device according to the embodiment of the invention.

FIG. 9 is a partial side sectional view of a lower rear portion of the multi function device 1. The housing 18 is separated into a plurality of isolation chambers by partition walls. A power supply box 22 including a power supply board 15, in which a power supply circuit is mounted, is mounted in an isolation chamber 40 located in a lower rear portion of the body portion 5. The power supply box 22 is surrounded by a nonflammable resin. A large number of heat radiation holes 22d are formed in side walls 22a and 22b and a ceiling wall 22c of the power supply box 22.

The isolation chamber 40 includes a ceiling wall 40b facing the power supply box 22. An opening portion 40a is formed in the ceiling wall 40b. As a result, because a flammable resin, which forms the ceiling wall 40b, is prevented from coming near the power supply circuit, reduction in size and thickness of the multi function device 1 can be attained as well as safety standards such as UL Standard can be satisfied.

The paper guide 20 and the paper bearing surface 21 are arranged to cover the upper portion of the power supply box 22. As a result, any accident can be prevented because an alien matter is prevented from coming into contact with the power supply circuit through the opening portion 40a even if the alien matter comes from the paper supply portion 2.

Incidentally, a film 42 made of a nonflammable resin such as PS (polystyrene) is disposed between a part of the circumference of the opening portion 40a and the power supply box 22. As a result, the power supply circuit can be shielded from the ceiling wall 40b of the flammable resin to thereby satisfy the safety standards.

The side wall 22a of the power supply box 22 and a partition wall 31 form a passage 33 in front of the power supply box 22. A harness 16 for connecting respective modules in the body portion 5 is disposed in the passage 33. An insulating sheet 14 is disposed between the power supply box 22 and the bottom plate 13 and between the passage 33 and the bottom plate 13. As a result, the power supply board 15 and the conductive bottom plate 13 can be brought near to each other to thereby attain reduction in size and thickness of the multi function device 1.

Figure 8:
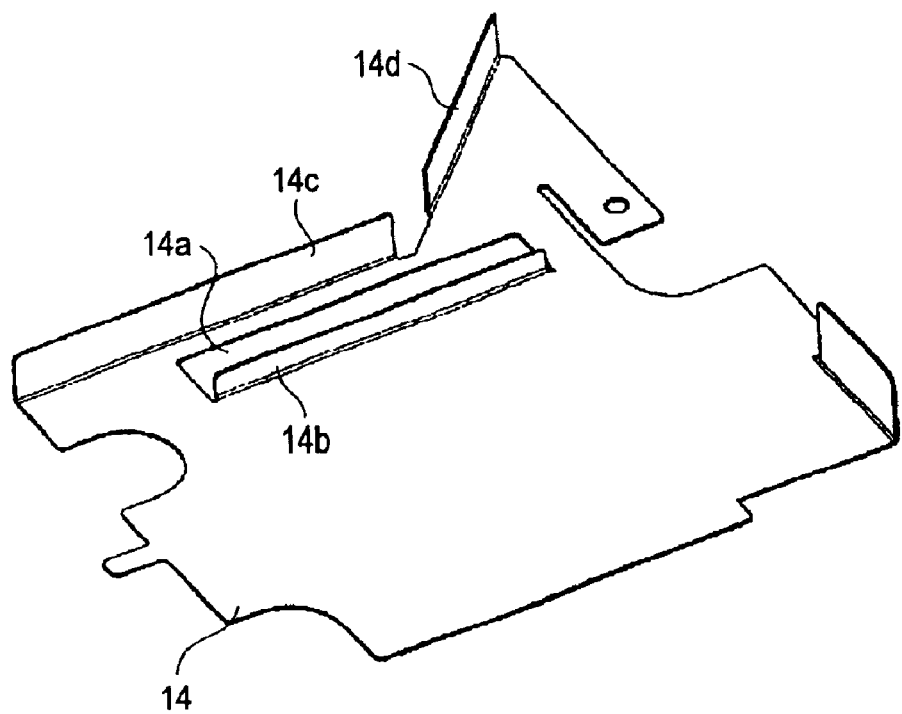
FIG. 8 is a perspective view showing the insulating sheet in the multi function device according to the embodiment of the invention.

FIG. 8 is a perspective view showing the insulating sheet 14. The insulating sheet 14 is made of a 0.5 mm-thick film of a nonflammable resin such as m-PPE (modified polyphenylene ether) or PC (polycarbonate). A part of the insulating sheet 14 is cut and erected to thereby form an opening portion 14a through which air can pass from the outside of the multi function device 1. A guide portion 14b is erected along a side of the opening portion 14a. That is, the guide portion 14b is formed so as to be erected continuously from the side of the opening portion 14a. End portions of the insulating sheet 14 are bent at the circumferential edge of the insulating sheet 14 to thereby erect guide portions 14c and 14d. That is, the guide portions 14c and 14d are formed so as to be erected continuously from the end portions of the insulating sheet 14.

Although this embodiment shows the case where the guide portions 14b to 14d are made of one member in such a manner that each guide portion is formed so as to be erected continuously, i.e., integrally from a side of the opening portion 14a or an end portion of the insulating sheet 14, the invention is not limited to this configuration. For example, the guide portions 14b to 14d maybe provided separately from the insulating sheet 14 and bonded to the insulating sheet 14 so that each guide portion can be erected from a side of the opening portion 14a or an end portion of the insulating sheet 14.

Figure 5:
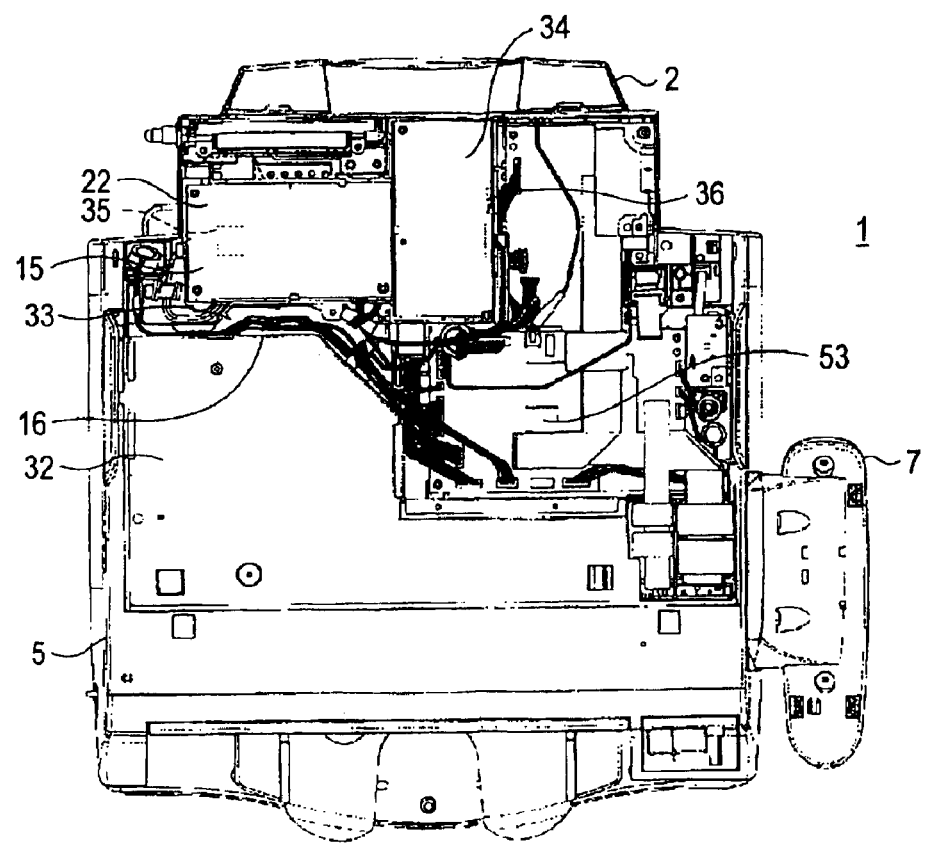
FIG. 5 is a rear view showing the multi function device according to the embodiment of the invention in a state in which a bottom plate and an insulating sheet are removed.

FIG. 5 is a rear view showing a state in which the bottom plate 13 and the insulating sheet 14 are removed. A bottom wall of a waste ink foam storage chamber 32 in which the waste ink foam 32a is stored is provided in front of the power supply box 22 so that the passage 33 separated by the partition wall 31 (see FIG. 3) is disposed between the bottom wall of the waste ink foam storage chamber 32 and the power supply box 22. A communication unit 34 is disposed on a side of the power supply box 22. A communication module (not shown) for controlling communication is disposed in the communication unit 34. A main board 53 is disposed in the multi function device 1 so as to be located slightly rightward with respect to the center of the multi function device 1 in FIG. 5.

A common mode choke coil 35 is mounted on the power supply board 15 while a transformer 36 is mounted on the communication module. The multi function device 1 is formed so that the power supply board 15 and the communication module are provided adjacently as a result of greater advance of reduction in size and thickness of the apparatus. Therefore, the common mode choke coil 35 on the power supply board 15 and the transformer 36 on the communication module are disposed so as to be as far from each other as possible. As a result, noise at the time of communication is restrained from being caused by the fact that the transformer 36 collects noise produced from the common mode choke coil 35.

Figure 6:
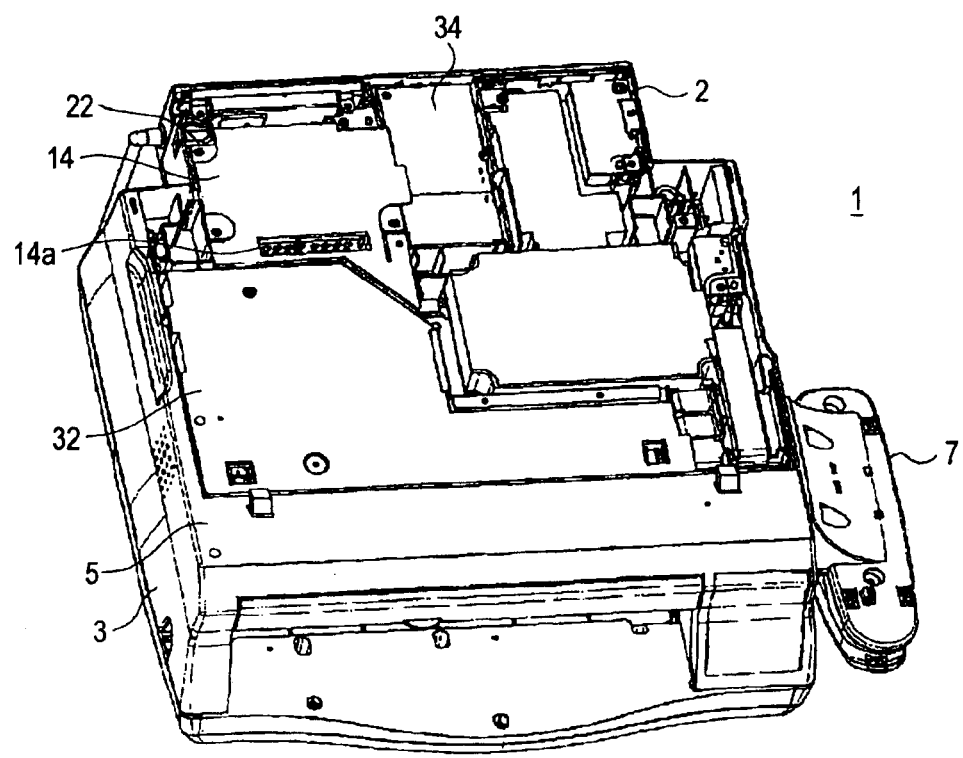
FIG. 6 is a rear view showing the multi function device according to the embodiment of the invention in a state in which the bottom plate is removed.

FIG. 6 shows a state in which the insulating sheet 14 is added to the state shown in FIG. 5. The insulating sheet 14 is disposed to cover the power supply board 15 and the passage 33. The guide portions 14b to 14d (see FIG. 8) of the insulating sheet 14 are formed to have shapes along the walls (22a and 31) (see FIG. 3) of the passage 33. Therefore, the guide portions 14b to 14d can be fitted to the passage 33 to make it easy to position the insulating sheet 14 when the insulating sheet 14 is placed on the bottom surface of the multi function device 1. Accordingly, improvement in assembling efficiency can be attained.

As shown in FIGS. 3 and 5, the harness 16 disposed in the passage 33 is guided by the guide portions 14b to 14d when the insulating sheet 14 is placed on the bottom surface of the multi function device 1. As a result, the harness 16 can be prevented from going onto the bottom wall of the waste ink foam storage chamber 32 and onto the power supply box 22 viewed from the rear, through the gap between the insulating sheet 14 and the wall surface of the passage 33 constituted by the partition wall 31 and between the insulating sheet 14 and the side wall 22a of the power supply box 22.

That is, the insulating sheet 14 is placed on the multi function device 1 in the condition that the multi function device 1 is turned upside down as shown in FIG. 6. On this occasion, because the guide portions 14b to 14d are fitted to the walls (22a and 31) of the passage 33 as described above, the harness 16 in the passage 33 is prevented from protruding upward from the insulating sheet 14. Accordingly, the bottom plate 13 can be easily attached to the bottom of the multi function device 1 because the harness 16 can be prevented from protruding upward from the power supply box 22, the bottom wall of the waste ink foam storage chamber 32 and the communication unit 34 even in the case where the bottom plate 13 will be attached to the bottom of the multi function device 1 after that.

Accordingly, the multi function device 1 can be assembled easily while the harness 16 is prevented from being sandwiched between the partition wall 31 and the bottom plate 13 and between the side wall 22a and the bottom plate 13. In addition, the power supply board 22 on the primary side and the harness 16 on the secondary side can be brought close to each other while prevented from coming into contact with each other. Reduction in size of the multi function device 1 can be attained.

As shown in FIG. 3, air can be taken into the housing 18 through the air inlets 13a and 13b (see FIG. 7) of the bottom plate 13 as represented by the arrows A1 and A2. The air taken into the housing 18 through the air inlet 13a passes through the holes 22d of the side wall 22b and ceiling wall 22c of the power supply box 22 as represented by the arrows B1 and B2 and flows out from an opening portion (not shown) of the paper supply portion 2.

On the other hand, the air taken into the housing 18 through the air inlet 13b passes between the bottom plate 13 and the insulating sheet 14 and flows into the passage 33 through the opening portion 14a. Then, the air passes through the holes 22d of the side wall 22a and ceiling wall 22c of the power supply box 22 as represented by the arrows B1 and B2 and flows out from the opening portion (not shown) of the paper supply portion 2.

In this manner, the power supply circuit can be cooled by air taken in not only from the rear of the power supply box 22 but also from the front of the power supply box 22.

Accordingly, the provision of the insulating sheet 14 permits not only reduction in size and thickness of the multi function device 1 but also improvement in heat radiating characteristic of the power supply circuit.

Incidentally, the air inlet 13*b* (see FIGS. 4 and 7) in front of the power supply box 22 is formed in a position that does not face the passage 33. As a result, an accident can be prevented from being caused by the fact that a finger or an alien matter comes into contact with the harness 16 through the air inlet 13*b*.

Although this embodiment has been described on an multi function device 1 having an insulating sheet, the invention may be also applied to another electronic apparatus having an insulating sheet interposed between a power supply board and a bottom plate.

According to the embodiment of the invention, the insulating sheet includes an opening portion through which air taken into the housing from the air inlets formed in the conductive bottom plate can pass, and a guide portion erected for guiding the harness disposed in the housing. Hence, the power supply circuit and the bottom plate can be brought close to each other so that reduction in size and thickness of the electronic apparatus can be attained. In addition, cooling air can be supplied to the power supply circuit through the opening portion. Accordingly, heat can be radiated sufficiently though the space surrounding the power supply circuit is reduced, so that reduction in size of the electronic apparatus can be attained.

Moreover, the guide portion can prevent the harness from dropping out and being put between the housing and the bottom plate, so that assembling can be made easily. In addition, the power supply board on the primary side and the harness on the secondary side can be brought close to each other while prevented from coming into contact with each other. Accordingly, greater reduction in size of the electronic apparatus can be attained.

According to the embodiment of the invention, the guide portion is formed along the opening portion by means of cutting and erecting. Hence, the opening portion and the guide portion can be formed easily. In addition, environmental pollution can be prevented because no resin waste is discarded when the opening portion is formed.

According to the embodiment of the invention, the insulating sheet can be positioned easily because the guide portion is inserted into the passage in which the harness is stored. In addition, the insulating sheet can be positioned more easily when the guide portion is formed along the wall surface of the passage.

According to the embodiment of the invention, the wall surface of the passage includes first and second partition walls for separating isolation chambers in which the power supply portion having the power supply board and another member are provided. Hence, the guide portion can easily prevent the harness from entering the power supply portion and the isolation chambers.

What is claimed is:

1. An insulating sheet comprising:
    a sheet portion;
    an opening portion which allows air to pass therethrough; and
    a guide portion which is erected.
2. The insulating sheet according to claim 1, wherein the guide portion is formed to continue from the sheet portion.
3. The insulating sheet according to claim 1, wherein the guide portion is fixed along the opening portion.
4. The insulating sheet according to claim 1, wherein the guide portion is fixed to an end portion of the sheet portion.
5. The insulating sheet according to claim 2, wherein the guide portion is a portion, which is cut and erected, to form the opening portion.
6. The insulating sheet according to claim 1, wherein the guide portion includes:
    a first guide portion formed along the opening portion; and
    a second guide portion formed by bending an end portion of the sheet portion.
7. An electronic apparatus comprising:
    a power supply board;
    a housing in which the power supply board and a harness are disposed;
    a conductive bottom plate which is attached to the housing and includes an air inlet; and
    an insulating sheet including:
        a sheet portion;
        an opening portion which allows air flowing from the air inlet of the conductive bottom plate to pass therethrough; and
        a guide portion which is erected and guides the harness,
    wherein:
        the insulating sheet is disposed between the power supply board and the conductive bottom plate.
8. The electronic apparatus according to claim 7, wherein the guide portion is formed to continue from the sheet portion.
9. The electronic apparatus according to claim 7, wherein the guide portion is fixed along the opening portion.
10. The electronic apparatus according to claim 7, wherein the guide portion is fixed to an end portion of the sheet portion.
11. The electronic apparatus according to claim 8, wherein the guide portion is a portion, which is cut and erected, to form the opening portion.
12. The electronic apparatus according to claim 7, wherein the guide portion includes:
    a first guide portion formed along the opening portion; and
    a second guide portion formed by bending an end portion of the sheet portion.
13. The electronic apparatus according to claim 7, wherein:
    the housing includes a passage which stores the harness; and
    the guide portion is inserted into the passage.
14. The electronic apparatus according to claim 13, wherein the guide portion is formed along a wall surface of the passage.
15. The electronic apparatus according to claim 13, further comprising:
    a first partition wall defining a power supply portion in which the power supply board is disposed; and
    a second partition wall defining an isolation chamber, wherein:
    wall surfaces of the passage are the first partition wall and the second partition wall.
16. An insulating sheet for insulating a power supply board in an electronic apparatus from a conductive outer plate of the electronic apparatus, the electronic apparatus including a harness therein, the insulating sheet comprising:
    a sheet portion;

an opening portion which allows air to pass therethrough; and a guide portion which is erected and guides the harness.

17. The insulating sheet according to claim 16, wherein the guide portion is formed to continue from the sheet portion.

18. The insulating sheet according to claim 16, wherein the guide portion is fixed along the opening portion.

19. The insulating sheet according to claim 16, wherein the guide portion is fixed to an end portion of the sheet portion.

20. The insulating sheet according to claim 17, wherein the guide portion is a portion, which is cut and erected, to form the opening portion.

21. The insulating sheet according to claim 16, wherein the guide portion includes:

a first guide portion formed along the opening portion; and a second guide portion formed by bending an end portion of the sheet portion.

* * * * *